US008355674B2

(12) United States Patent
Borremans

(10) Patent No.: US 8,355,674 B2
(45) Date of Patent: Jan. 15, 2013

(54) MULTI-CHANNEL TRANSMITTER

(75) Inventor: Marc Borremans, Oud-Heverlee (BE)

(73) Assignee: ST-Ericsson SA, Plan-les-Ouates (CH)

( * ) Notice: Subject to any disclaimer, the term of this patent is extended or adjusted under 35 U.S.C. 154(b) by 1347 days.

(21) Appl. No.: 12/044,141

(22) Filed: Mar. 7, 2008

(65) Prior Publication Data

US 2008/0220730 A1 Sep. 11, 2008

(30) Foreign Application Priority Data

Mar. 8, 2007 (EP) .................................... 07004752

(51) Int. Cl.
*H04B 7/00* (2006.01)
*H04B 1/00* (2006.01)

(52) U.S. Cl. ................. 455/59; 455/68; 455/69; 455/70

(58) Field of Classification Search .................... 455/59, 455/68, 69, 70, 45, 219, 220, 221, 38.1, 38.2, 455/228, 229, 93, 3.06
See application file for complete search history.

(56) References Cited

U.S. PATENT DOCUMENTS 5,584,051 A 12/1996 Göken
6,006,075 A 12/1999 Smith et al.
2003/0227982 A1 12/2003 Chen et al.
2005/0157810 A1 7/2005 Raleigh et al.
2006/0223467 A1 10/2006 Mason

FOREIGN PATENT DOCUMENTS

EP 0 920 170 A2 6/1999
EP 1 259 007 A2 11/2002
EP 1259007 A2 11/2002

OTHER PUBLICATIONS

European Search Report from corresponding European Application No. EP 07 00 4752, filed Mar. 8, 2007.
European Search Report dated Aug. 11, 2011 from corresponding European Application No. 11156201.1.

*Primary Examiner* — Eugene Yun
(74) *Attorney, Agent, or Firm* — Coats & Bennett, P.L.L.C.

(57) ABSTRACT

A radio transmission method and a radio transmitter device for radio transmission of an audio signal from an audio device to a radio receiver wherein an audio signal is received from the audio device, and an RF signal is transmitted simultaneously which is modulated with the audio signal on each of a set of at least two different RF channels. Within each of the transmitted RF signals, information identifying at least the other RF channels in the set of RF channels is included.

32 Claims, 4 Drawing Sheets

| | | |
|---|---|---|
| 1st 0A | #3 | AF1 |
| 2nd 0A | AF2 | AF3 |

| | | |
|---|---|---|
| 1st 0A | #2 | AF1 |
| 2nd 0A | AF2 | filler code |

MULTI-CHANNEL TRANSMITTER

BACKGROUND OF THE INVENTION

1. Field of the Invention

This invention relates to transmission apparatus for transmitting an audio signal from an audio device to a radio receiver and to a corresponding method of transmitting an audio signal. This invention also relates more generally to a transmitter device which transmits on multiple channels.

2. Discussion of the Related Art

Portable media players are an increasingly popular way for a user to carry around their collection of media content. The media content can include audio content such as music tracks and podcasts as well as video content. A user often wants to connect their media player to the audio system in a vehicle, so that they can listen to the audio content through the speakers of the vehicle's audio system. Some vehicles have dedicated connectors, such as jack sockets or a proprietary interface, but many vehicles lack this feature.

One known way of connecting a media player to a vehicle's audio system is to use a low-powered Frequency Modulated (FM) transmitter. The transmitter receives an audio input from the media payer and modulates this onto one of the frequency channels of the VHF FM radio frequency band (87.5-108 MHz) used for licensed radio broadcasts. In this way, the audio output of the media player can be received in the same manner as a conventional FM radio broadcast on the vehicle's FM radio receiver. Regulatory bodies in many countries now allow unlicensed use of these low-power transmitter devices. The transmitter device stores a single transmission frequency which can typically be selected by a user from one of the frequencies across the VHF FM band. In use, a user manually selects a free channel which is not used by a broadcast radio station and selects this as the frequency at which the low-power transmitter device will operate. The in-vehicle radio receiver is tuned to the same channel.

One of the problems with using a device of this kind is that, as a user drives across a region, they may find that the channel they had selected for the low-power transmission is used by a high-powered licensed transmission of a radio station. This requires the user to manually retune both the transmitter device and the in-vehicle radio receiver to a new channel. This is inconvenient, and can be dangerous if a user attempts this operation whilst driving.

The Radio Data System (RDS) is widely used by broadcasters operating in the VHF FM band. The latest version of the RDS standard is published by the International Electrotechnical Commission (IEC) as IEC 62106 (1999). RDS adds a sub-carrier to the FM multiplex at 57 kHz which carries digital data. As FM transmissions have a limited range, a national radio station has to broadcast on different frequencies in neighboring regions to avoid interference. One of the uses of the RDS data channel is to carry a list of Alternate Frequencies. This is a list of neighbouring VHF FM transmitting stations which broadcast the same radio station. When the radio station is received weakly on the current channel, the receiver can select one of the channels specified in the Alternate Frequency list and retune to that channel.

WO 2006/106379A1 describes a device for low-power transmission of audio data to an RDS-capable radio receiver. The device performs a scan of available radio frequencies and selects one of the available frequencies for transmission. Audio data is transmitted over that frequency in a conventional manner by frequency modulating the carrier frequency. Details of the other available frequencies that were found during the scan are sent to the receiver using the Alternate Frequency (AF) field of an RDS data channel forming part of the transmitted signal. WO 2006/106379 only transmits on a single frequency channel at any time. Under poor transmission conditions, there can be uncertainty as to when the device will select one of the alternate frequencies, and which one of the alternate frequencies it will choose. Also, under conditions of multi-path fading, a receiver can experience poor reception of the channel selected by the transmitter device at a time when the transmitter device considers the selected channel is acceptable.

SUMMARY OF THE INVENTION

An object of the present invention is to provide improved apparatus and an improved way of transmitting an audio signal to a radio receiver.

By simultaneously transmitting on a set of different channels, the receiver can select one of the alternate channels at any time, and retune to this. One problem which can affect low-power, short range, transmissions is multi-path fading. Multi-path fading can seriously degrade the quality of signal at the receiver, but as this degradation is local to the receiver it may not be detected by the transmitter device. By simultaneously transmitting on a set of different channels, the receiver can select one of the alternate channels at any time, independently of the transmitter, and can therefore overcome the effects of multi-path fading. The set of RF signals can comprise two or more RF signals. The upper limit will be bounded by practical limitations such as cost to implement the transmitter and the amount of power that would be consumed by a large number of transmitted signals.

The information identifying the other RF channels could be carried by another type of communication, e.g. Bluetooth. For example if the receiver is configured for Bluetooth, this signal could be sent over a Bluetooth link.

Preferably, the identification of alternate channels is achieved by using the Alternate Frequency (AF) field of an RDS data channel carried by each of the transmitted signals. The radio receiver needs to be RDS-capable to receive, and use, the AF data. However, even non-RDS receivers can benefit from the invention as in the event of interference occurring on the current RF channel, there is only a need to retune the receiver to another one of the RF channels on which the transmitter device transmits. The tuning can be performed manually or by using the conventional band scanning feature of a receiver.

The set of RF channels on which the transmitter device transmits can be permanently fixed, or at least one of the set can be Manually selectable by a user, or automatically selectable by the transmitter device. One way of automatically selecting the channel is for the transmitter, device to incorporate a receiver which is arranged to scan of a band of channels and to select an available channel based on the results of the scan.

Some adjustment of at least one of the RF channels in case all of the N transmitted RF signals interfere with existing broadcasting stations can be included within the scope of the present invention. The present invention includes the combination of a "silent frequency scan" and the multi-channel transmitter. An alternative or complement to the silent scan can be to store a preferred frequency list based on user experience by location (e.g. at HOME, in the office, on location, on holiday etc).

The RF channels on which the transmitter device transmits can be VHF FM band channels although the invention can be applied to any other existing, or future, transmission schemes.

The transmitter device can be a unit which is manufactured and sold separately from the audio device. In this case, the transmitter device can receive the audio signal via an interface between the devices. The audio input can be in the form of an analog signal (at baseband or modulated in some way) or in the form of a digital data signal representing audio data. The interface can be electrical or optical, e.g. jack socket, RCA connector, Sony/Philips Digital Interface Format (S/PDIF) or TOSLINK digital connector, IEEE 1394, Universal Serial Bus (USB) or a proprietary interface. The interface can be a cable which is terminated with appropriate connectors or the transmitter device can be implemented as a housing which has a connector projecting from it, which is intended to plug directly into an audio output socket of the audio device. Alternatively, the transmitter device can be integrated within the audio device and can receive the audio input signal via an internal analog or digital interface.

The audio device can be a media player or any other device which emits an audio signal, such as a mobile telephone, voice recorder, Personal Digital Assistant (PDA) or personal computer. The form of the media player is unimportant and can be, for example, a player which stores media content on a hard disk or solid state memory, a compact disc player or a tape player. The radio receiver is preferably a conventional radio receiver, such as a VHF FM receiver, which requires no modification.

A significant part of the transmitter device can be implemented in the digital domain. This can be achieved by software executed by a general-purpose or dedicated processor, by digital hardware or a combination of these. In addition, the control functions of the transmitter device can be implemented by software executed by a processor or by control logic. Accordingly, another aspect of the invention provides software for causing a processor of a radio transmitter device to implement the method described above. The software may be stored on an electronic memory device, hard disk, optical disk or other machine-readable storage medium. The software may be delivered as a computer program product on a machine-readable carrier or it may be downloaded to the transmitter device via a network connection.

Another aspect of the present invention seeks to simplify the apparatus required to transmit on multiple channels.

Accordingly, another aspect of the present invention provides a radio transmitter device comprising:

an input for receiving an input signal;

a transmitter arranged to simultaneously transmit an RF signal which is modulated with the input signal on each of a set of at least two different RF channels, wherein the transmitter comprises:

a set of intermediate frequency modulation stages arranged in parallel with one another, each intermediate frequency modulation stage arranged to modulate a selected intermediate frequency with the input signal, wherein the set of intermediate frequencies are offset from one another, in the same relationship as the set of RF channels; and, an RF stage arranged to translate the modulated intermediate frequency signals to an RF transmission frequency band.

An advantage of the transmitter device is that the RF stage is simplified, as each of the signals in the set of intermediate frequencies can be translated by the same offset frequency to the RF transmission frequency band. Preferably, a single RF stage translates all of the modulated intermediate frequency signals to an RF transmission frequency band. Embodiments of the present invention can have either a common RF stage or individual RF stages which work in the same way. The present invention also includes embodiments that do not have different IF frequencies, and which use different local oscillators (LO) running at different frequencies The main advantage of embodiments shown in FIGS. 9 and 11 is the low extra cost for implementing the multi-channel transmitter. Other implementations are included in the scope of the present invention, for example, using different local oscillator frequency signals or by putting different IF mixers between the DAC and the RF mixer In situations where the input signal requires formatting before modulation (e.g. converting a stereo audio signal into an FM Multiplex (MPX) format), a single signal generation stage can perform the formatting before feeding the formatted signal to each of the intermediate frequency modulation stages. This further reduces the amount of apparatus to implement the transmitter device.

BRIEF DESCRIPTION OF THE DRAWINGS

Embodiments of the invention will be described, by way of example only, with reference to the accompanying drawings in which.

DETAILED DESCRIPTION

Figure 1:
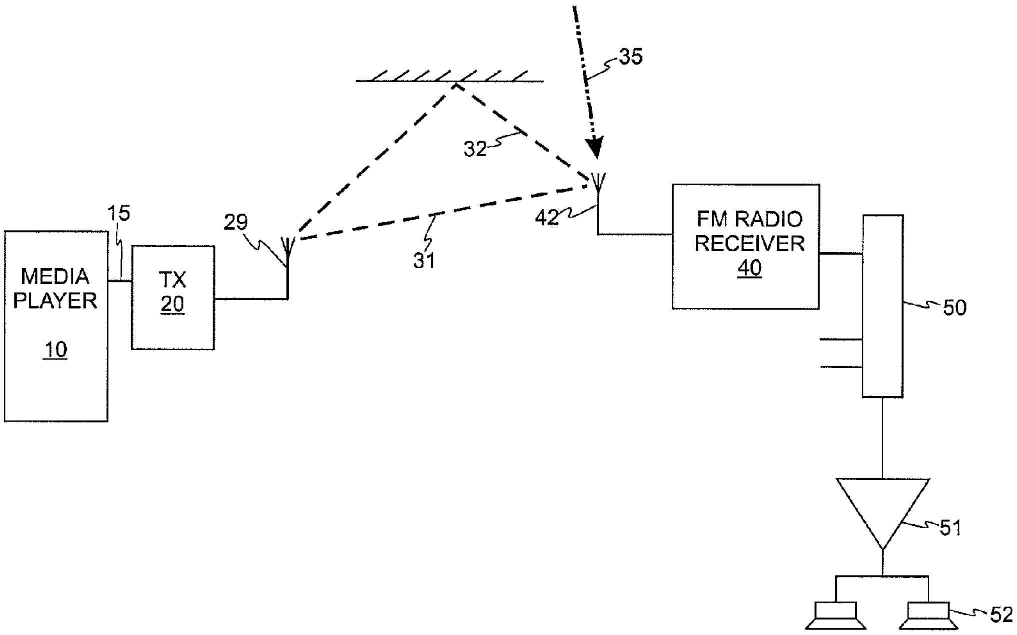
FIG. 1 shows a system for transmitting audio signal to an FM radio receiver which uses a transmitter device according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

FIG. 1 shows a system in accordance with an embodiment of the present invention. An audio device such as a media player 10 or mobile telephone (or for example a laptop computer, a smartphone, home (multi-media) entertainment equipment, etc.) is connected to a transmitter device 20 and feeds an audio signal 15 to the transmitter device 20. The connection between the media player 10 and transmitter device 20 can be achieved by any suitable connection technology, such as by an audio connecting lead which is terminated in a manner which matches the media player 10 and transmitter device 20. The transmitter device 20 can be implemented as a device which is separate from the media player. The transmitter device 20 can physically mount on, or alongside, the media player 10. Alternatively, the transmitter device 20 can be incorporated within the media player 10 itself or vice versa. Transmitter device 20 modulates the audio signal received from the media player 10 onto a set of different frequency channels and transmits this set of signals from an antenna 29. These frequency channels, for example, can be distributed across a VHF FM band. Each of the signals in the set carries a copy of the same audio signal. The signals are received by a radio receiver, e.g. a conventional VHF-band FM radio receiver 40 receives the signals transmitted by the transmitter device 20. The receiver 40 can form part of an in-vehicle audio system. In a conventional manner, the in-vehicle audio system comprises a selector 50 for selecting one of the input sources, an audio amplifier 51 and audio speakers 52. In the case of an in-vehicle system, antenna 42 will typically be mounted on the exterior surface of the vehicle, or in the rear screen. The transmission path between the transmitter device 20 and receiver 40 can be a direct path 31 but more usually it will include multiple components 31, 32 which follow paths of different lengths. Component 32 is shown reflected off a surface of the vehicle. The different lengths of the paths, traveled by components 31, 32 introduce a phase difference between the components 31, 32. Depending on the value of this phase difference, the signals may sum in a destructive manner. In addition, broadcast (licensed) signals 35 are also received at antenna 42. These will usually have a much greater power than the signals from the transmitter device 20. From time-to-time, signals 35 will occupy the same frequency as one of the signals transmitted by the transmitter device 20 and will interfere with that frequency.

Figure 2:
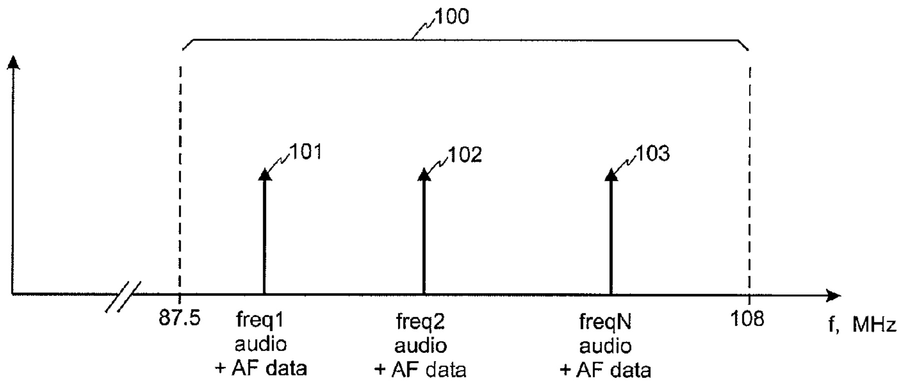
FIG. 2 shows a plot, in the frequency domain, of the signals output by the transmitter device.

FIG. 2 shows the output of a transmitter device 20. The VHF FM band 100 typically occupies a frequency range of 76 MHz-108 MHz, e.g. 87.5-108 MHz, or any other, limits of this band depending upon the regulations of the country or countries involved. The transmitter device transmits a set of signals 101, 102, 103. Each signal carries the same audio data from the media player 10, modulated in a conventional FM multiplex format. Each signal 101, 102, 103 also carries an RDS subcarrier.

Figures 3, 4, 5:
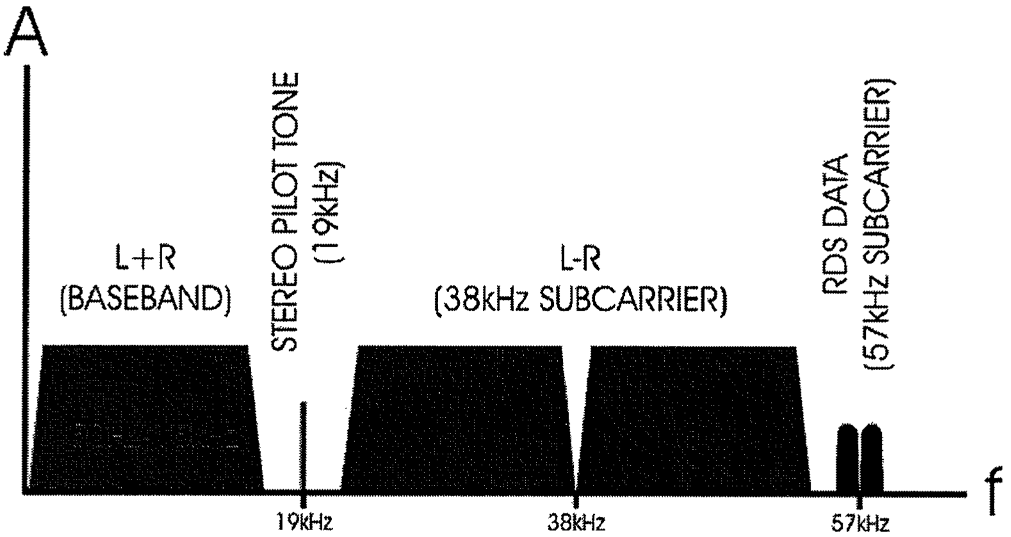
FIG. 3 shows a conventional FM multiplex.
FIGS. 4 and 5 show formats for sending RDS Alternate Frequency data.

FIG. 3 shows the conventional format of an FM multiplex. For compatibility with conventional FM receivers 40, the transmitter device 20 transmits the audio signal from the media player 10 in this conventional format. The FM multiplex comprises a sum (L+R) of the left and right channels of a stereo audio signal and a difference (L−R) of the left and right channels of the stereo audio signal. The sum signal is transmitted as baseband audio in the range 30 Hz to 15 kHz. The difference (L−R) signal is amplitude modulated onto a 38 kHz suppressed carrier to produce a double-sideband suppressed carrier (DSBSC) signal in the range 23 kHz-53 kHz. A 19 kHz pilot tone is also transmitted and used by the receiver to regenerate the 38 kHz subcarrier. A further subcarrier at 57 kHz carries the RDS data. The entire FM multiplex is then frequency modulated onto a carrier and translated to the required VHF channel frequency.

One feature of the RDS data channel is Alternate Frequency (AF) data which identifies other transmitting stations broadcasting the same content. In the present invention, instead of using AF data to identify the frequency of other transmitting stations broadcasting the same content, the AF data identifies each of the other frequencies that the transmitter device 20 is using. For example, the AF data in signal 101 will identify the frequencies of signals 102 and 103; the AF data in signal 102 will identify the frequencies of signals 101 and 103, and so on. Section 3.2.1.6 of the RDS Standard IEC 62106 describes a standardized coding format for identifying the frequency channels. A carrier frequency is specified by an 8-bit binary code. The coding scheme uses the code "0000 0001" to identify the frequency 87.6 MHz. The coding scheme then assigns a code to frequencies at a frequency interval of 0.1 MHz, finishing with the code "1100 1100" identifying the frequency 107.9 MHz. Other codes are assigned special meanings and other code tables exist for other frequency bands. RDS data is carried in data structure known as a group, each group being 104 bits long. Different types of group carry different types of RDS data. Alternate Frequency data is carried within Group type 0A (basic tuning and switching information). Two AF data items are carried within block 3 of each 0A group. The first byte in the transmitted list indicates the number of Alternate Frequencies in the list. FIG. 4 shows the format of a transmission carrying three AFs. The first AF code represents the number of Alternate Frequencies (3) and the following three AF codes identify the frequencies. The AF codes are carried in pairs within two type 0A groups. FIG. 5 shows the format of a transmission carrying two AFs. The first AF code represents the number of Alternate Frequencies (2) and the following two AF codes identify the frequencies. The final, unused, AF code space is occupied by a code having a filler value which signifies this AF field is unused.

Radio receiver 40 operates in a conventional manner. Receiver 40 is typically a superheterodyne receiver which receives a signal from the antenna 42, translates it to a fixed intermediate frequency (IF) by mixing the received signal with a locally generated signal, and the filters and demodulates the IF signal to extract the required audio signal and RDS data. Receiver 40 monitors the quality of the received signal. When the quality of the received signal falls below a predetermined threshold quality, the receiver inspects the Alternate Frequency list in the RDS data, tunes to one of the alternate frequency channels, and monitors quality of the received signal on the new channel. The receiver can retune multiple times until an alternate frequency channel offers the required quality.

Figure 6:
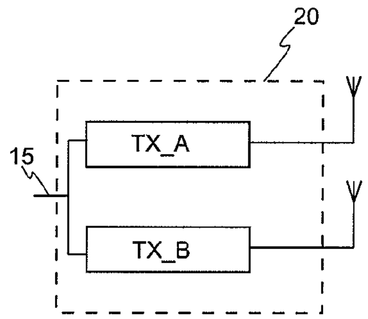
FIGS. 6 and 7 show embodiments of the transmitter device using parallel transmission stages.
Figure 7:
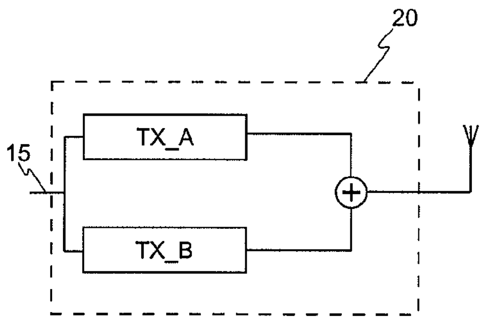

The transmitter device 20 will now be described in more detail. There are a range of ways in which the set of simultaneous transmissions at different frequencies can be achieved. FIG. 6 shows a first embodiment of the transmitter device 20 in which two transmitters TX_A, TX_B are arranged in parallel. The audio signal 15 is applied to each of the transmitters. Each transmitter has an, antenna. FIG. 7 shows a second embodiment of the transmitter device 20, in which two transmitters TX_A, TX_B are arranged in parallel. The audio signal 15 is applied to each of the transmitters. The RF output of each transmitter TX_A, TX_B is summed and applied to a single shared antenna.

FIGS. 8-12 show embodiments of the transmitter device 20 which use a single transmitter. These embodiments share the concept of generating a different intermediate frequency (IF) for each of the transmitted channels, combining the signals at the different IF frequencies, and then translating the set of signals at the different IF frequencies to the RF band by use of a common local oscillator frequency. The embodiments differ in the number of stages of the apparatus which are implemented in the analog domain; using analog circuitry, and in the digital domain, using digital processing.

Figure 8:
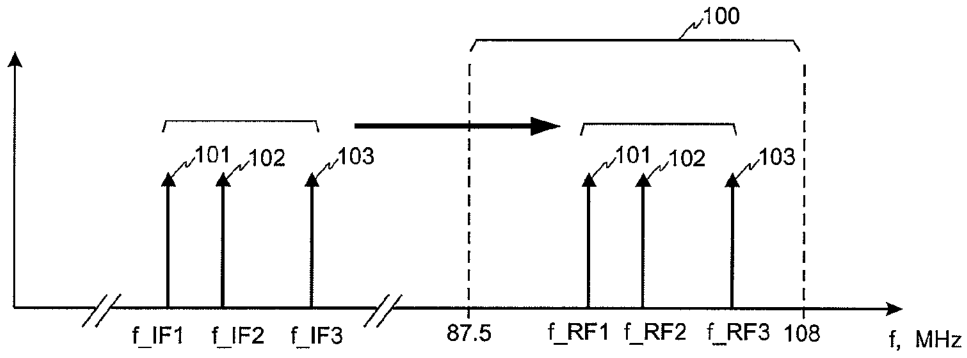
FIG. 8 shows a plot, in the frequency domain, to illustrate operation of a transmitter device in accordance with the present invention which generates signals at multiple intermediate frequencies.

FIG. 8 shows a plot in the frequency domain to illustrate the use of different IF frequencies. In this example there is a set of three transmitted signals but the invention can be applied more generally to a set of N signals. The frequency, at RF, (f_RF) of each signal is the sum of an IF frequency (f_IF) and a local oscillator frequency (f_LO) which is used to shift the signal from IF to RF:

$$f\_RF1=f\_IF1+f\_LO$$

$$f\_RF2=f\_IF2+f\_LO$$

$$f\_RF3=f\_IF3+f\_LO$$

The local oscillator frequency (f_LO) is the same for each of the signals. Therefore, the spacing of the set of intermediate frequency signals (f_RF1, f_IF2, f_IF3) is the same as the spacing of the set of RF signals (f_RF1, f_RF2, f_RF3).

Figure 9:
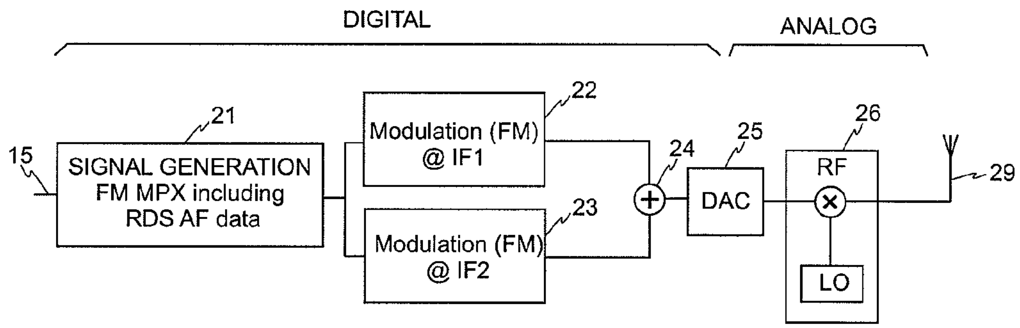
FIG. 9 shows a first embodiment of a transmitter device which generates signals at multiple intermediate frequencies.

FIG. 9 shows an embodiment of the transmitter device 20 in which generation of the FM multiplex signal, modulation at multiple intermediate frequencies and summation is all performed in the digital domain. A signal generation stage 21 receives the audio signal 15 from the media player 10. An FM multiplex MPX is generated, in the digital domain. This FM MPX has the format shown in FIG. 3 and includes Alternate Frequency (AF) RDS data identifying the other RF channels.

If stage 21 is shared, the AF data added at stage 21 can be exactly the same for each of the signals, e.g. signal 101 can carry an identification of itself and of 102, 103 or the signal 101 could only list 102, 103 and not itself.

The digital FM MPX signal is applied to a pair of Modulating stages 22, 23 arranged in parallel with one another. Each stage frequency modulates the FM MPX signal at the required intermediate frequency (IF). The first stage 22 frequency modulates the FM MPX signal to IF1 and the second stage 23 frequency modulates the FM MPX signal to IF2.

The FM modulator may be implemented in any of a number of different topologies, each of which is an embodiment of the present invention. For example, a phase accumulator with lookup table may be provided, or a DSP may be used or software may be used. The IF frequency is not necessarily a limiting factor for multi-channel transmission. Some practical limitations may be implied by the (analog) signal processing chain and the specifications of the building blocks (filter bandwidth, linearity specifications, current consumption, etc). Also the bandwidth of the antenna can be a limit of the IF spacing of the topology. One preferred range of the IF is in the range from a few 100 kHz, e.g. 2 kHz, to a few MHz, e.g. 8 MHz (also negative if possible).

The resulting pair of signals at their respective intermediate frequencies IF1, IF2 are then digitally summed in adder 24. This digital signal is converted to the analog domain by digital-to-analog converter 25. The analog signal is translated to RF (specifically, the VHF FM band) by mixing with a local oscillator. The resulting RF signal is applied to antenna 29. It can be seen that this embodiment has an advantage over the embodiment shown in FIGS. 6 and 7 in that only a single signal generation stage 21 is required. Also, this embodiment has an advantage in that only a single analog RF stage is required, which reduces the size and cost of the apparatus (e.g. reduced silicon area). Therefore, the overall increase in apparatus to implement transmission on multiple channels is not significant, and is limited to additional digital processing which can be achieved relatively cheaply.

The analog RF stage can optionally be adapted to cope with there being multiple IF signals. From a topology point of view the blocks can be shared. For the digital processing before the FM modulation there is no extra cost. The requirements of the analog blocks can change: for example, the linearity of the multi-tone signal instead of a single tone or to cover the changed dynamic range of each signal.

Figure 10:
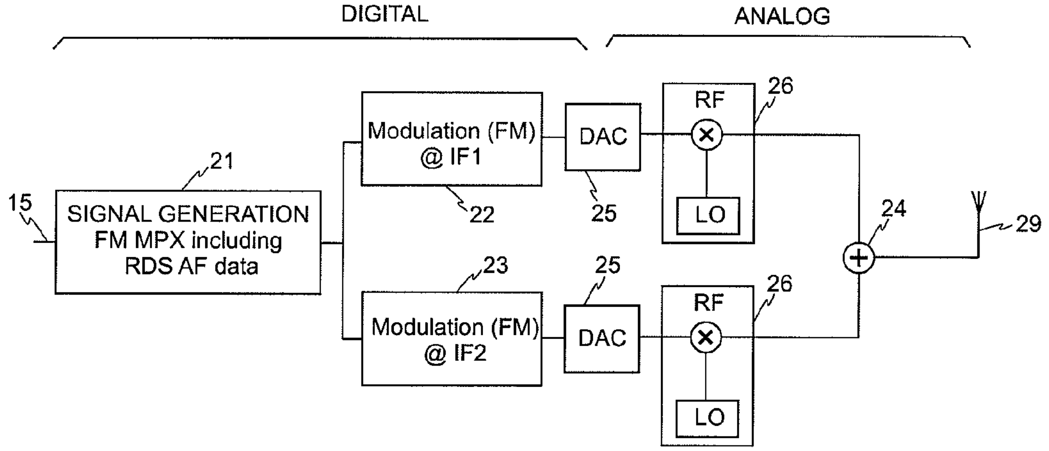
FIG. 10 shows a second embodiment of a transmitter device which generates signals at multiple intermediate frequencies.

FIG. 10 shows an embodiment of the transmitter device 20 in which generation of the FM multiplex signal and modulation at multiple intermediate frequencies is performed in the digital domain. As previously described, a signal generation stage 21 receives the audio signal 15 from the media player 10. An FM multiplex MPX is generated, in the digital domain. The digital FM MPX signal is applied to a pair of modulating stages 22, 23 arranged in parallel with one another. Each stage frequency modulates the FM MPX signal at the required intermediate frequency (IF). The first stage frequency modulates the FM MPX signal to IF1 and the second stage frequency modulates the FM MPX signal to IF2. The resulting pair of signals are then individually converted to the analog domain by digital-to-analog converter 25. Each analog signal is then translated to RF by a respective analog RF stage 26. As both of the RF stages 26 have the same function, a single local oscillator (LO) can be shared by both of the analog stages 26. The resulting pair of RF signals, each at a different VHF frequency, is combined 24 and applied to antenna 29. It can be seen that this embodiment also has an advantage over the embodiment shown in FIGS. 6 and 7 in that that only a single signal generation stage 21 is required.

Figure 11:
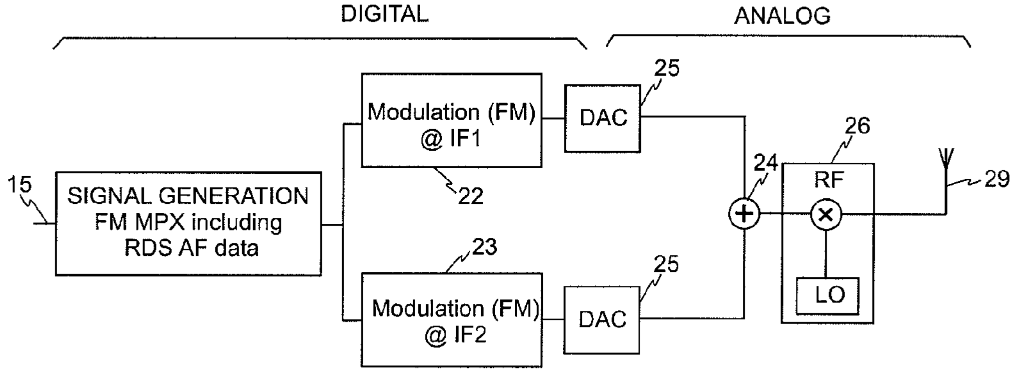
FIG. 11 shows a third embodiment of a transmitter device which generates signals at multiple intermediate frequencies; and, FIG. 12 shows an enhancement to the transmitter device in which a receiver is provided for detecting available channels.

FIG. 11 shows a further embodiment of the transmitter device 20 in which generation of the FM multiplex signal and modulation at multiple intermediate frequencies is performed in the digital domain. As previously described, a signal generation stage 21 receives the audio signal 15 from the media player 10. An FM multiplex MPX is generated, in the digital domain. The digital FM MPX signal is applied to a pair of modulating stages 22, 23 arranged in parallel with one another. Each stage frequency modulates the FM MPX signal at the required intermediate frequency (IF). The first stage frequency modulates the FM MPX signal to IF1 and the second stage frequency modulates the FM MPX signal to IF2. The resulting pair of signals are then individually converted to the analog domain by digital-to-analog converter 25. The pair of modulated signals are then combined 24. The combined analog signal is then translated to RF by an analog RF stage 26 and the RF signal is applied to antenna 29.

Further variants of the transmitter device (not shown) can be derived. For example, IF mixing in the analog domain, combination after the DAC, before or after an the RF mixer, before or after the RF amplifier, etc The present invention includes within its scope that an entirely digital transmitter is provided which directly creates the RF-band modulated signal, i.e. which removes the need for an analog RF mixing stage. For a digital transmitter two configurations could be considered: digital modulation of the RF oscillator or using a high frequency D/A converter. For the digital controlled oscillator, generation of a multi channel signal is less preferred. A high speed DAC is also included within the scope of the present invention.

Figure 12:
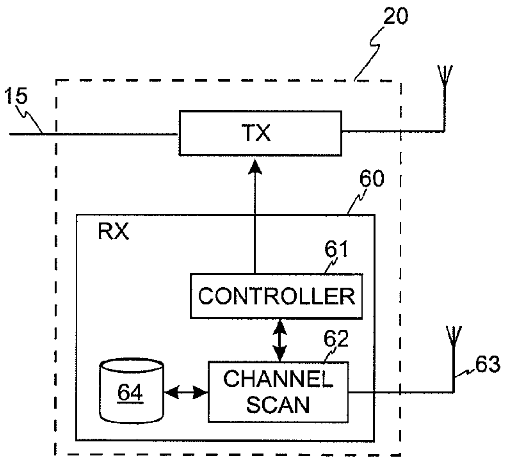

The set of RF channels on which the transmitter device 20 transmits can be fixed or, more preferably, is variable to cope with the local environment. The value of at least one of the RF channels can be manually adjustable by a user. The number of the transmitted signals which is variable in transmission frequency can be only one of the signals, a sub-set of the full set of signals, or all of the set of signals. FIG. 12 shows a further embodiment of the transmitter device 20. The transmitter TX can be implemented in any of the ways shown in FIGS. 6 to 11. A receiver 60 receives signals from the local environment via an antenna 63. A channel scan function 62 automatically scans the VHF FM band and detects activity on each of the channels. The results can be stored in a memory 64. Controller 61 selects the channels which, based on the scan results, appear to have the least activity and notifies transmitter TX of these channels. Transmitter TX selects these channels for the transmissions. In the embodiments of FIGS. 8 to 11, the channels can be selected by varying the IF frequency in stages 22, 23.

The above description describes how the Alternate Frequency (AF) field of an RDS data channel can be used to send details of other frequencies used by the transmitter device. Additionally, other fields of the RDS data channel can also be used. The Program Service (PS) field, usually carries data which can display an eight-character identification of the radio station at a radio receiver. This field can be used to carry an identification of the media player so that a user knows they have tuned the receiver 40 to one of frequencies used by the transmitter device 20. The Radio Text (RT) field allows a radio station to transmit a 64-character string of text. This field can be used to carry an identification of the media item currently being played, such as song title, album name, podcast title etc.

The invention is not limited to the embodiments described herein, which may be modified or varied without departing from the scope of the invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A radio transmitter device for radio transmission of an audio signal from an audio device to a radio receiver, the radio transmitter device comprising:
- an audio input for receiving an audio signal from the audio device;
- a transmitter arranged to simultaneously transmit an RF signal which is modulated with the audio signal on each of a set of at least two different RF channels, each at a different frequency, and the transmitter is further arranged to include, within each of the transmitted RF signals, at least information identifying the other RF channels in the set of RF channels.

2. A radio transmitter device according to claim 1, wherein the transmitter is arranged to send the information about the other RF channels in the Alternate Frequency field of an RDS subcarrier.

3. A radio transmitter device according to claim 1, wherein the value of at least one of the RF channels in the set is selectable from a range of possible RF channels.

4. A radio transmitter device according to claim 3, further comprising a receiver arranged to scan for available RF channels and the transmitter is arranged to select the value of the at least one selectable RF channel based on the results of the scan.

5. A radio transmitter device according to claim 1, wherein the transmitter comprises a set of transmitter units arranged in parallel with one another, each of the transmitter units being arranged to generate an RF signal which is modulated with the audio signal on one of the RF channels in the set of RF channels.

6. A radio transmitter device according to claim 5 wherein the set of transmitter units share a common antenna.

7. A radio transmitter device according to claim 1, wherein the transmitter comprises:
- a signal generation stage arranged to generate a multiplex signal which includes the audio signal and the information identifying the other RF channels;
- a set of intermediate frequency modulation stages arranged in parallel with one another, each intermediate frequency modulation stage arranged to modulate a selected intermediate frequency with the multiplex signal, wherein the set of intermediate frequencies are offset from one another in the same relationship as the set of RF channels.

8. A radio transmitter device according to claim 7, wherein the signal generation stage and the set of intermediate frequency modulation stages are implemented in the digital domain.

9. A radio transmitter device according to claim 7, wherein the transmitter further comprises:
- a combiner for combining the set of modulated intermediate frequency signals; and,
- an RF stage arranged to translate the combined signals to an RF transmission frequency band.

10. A radio transmitter device according to claim 9, wherein the combiner and the RF stage are implemented in the analog domain.

11. A radio transmitter device according to claim 9, wherein the combiner and the RF stage are implemented in the analog domain.

12. A radio transmitter device according to claim 7, wherein the transmitter further comprises:
- an RF stage positioned after each of the intermediate frequency modulation stages, each RF stage arranged to translate the modulated intermediate frequency signal to an RF transmission frequency band; and,
- a combiner for combining the set of RF signals.

13. A radio transmitter device according to claim 7, wherein the intermediate frequency modulation stages are arranged to frequency modulate an intermediate frequency signal with the multiplex signal.

14. A radio transmitter device according to claim 1, wherein the RF channels are VHF FM band channels and the radio receiver is a VHF FM band receiver.

15. A method of transmitting an audio signal from an audio device to a radio receiver, comprising:
- receiving an audio input signal from the audio device;
- simultaneously transmitting an RF signal which is modulated with the audio signal on each of a set of at least two different RF channels, each at a different frequency, and including, within each of the transmitted RF signals, at least information identifying the other RF channels in the set of RF channels.

16. A method according to claim 15, wherein the information about the other RF channels is transmitted in the Alternate Frequency field of an RDS subcarrier.

17. A method according to claim 15, further comprising selecting the value of at least one of the RF channels in the set from a range of possible RF channels.

18. A method according to claim 17, further comprising scanning for available RF channels and selecting the value of the at least one selectable RF channel based on results of the scan.

19. Software for causing a processor of a radio transmitter device to implement the method of claim 15.

20. A radio transmitter device comprising:

an input for receiving an input signal;

a transmitter arranged to simultaneously transmit an RF signal which is modulated with the input signal on each of a set of at least two different RF channels, each at a different frequency, wherein the transmitter comprises:

a set of intermediate frequency modulation stages arranged in parallel with one another, each intermediate frequency modulation stage arranged to modulate a selected intermediate frequency with the input signal, wherein the set of intermediate frequencies are offset from one another in the same relationship as the set of RF channels; and, an RF stage arranged to translate the modulated intermediate frequency signals to an RF transmission frequency band.

21. A radio transmitter device according to claim 20, further comprising a signal generation stage arranged to generate a multiplex signal using the input signal and to apply the multiplex signal to each of the set of intermediate frequency modulation stages.

22. A radio transmitter device according to claim 21, wherein the signal generation and the set of intermediate frequency modulation stages are implemented in the digital domain.

23. A radio transmitter device according to claim 21, wherein the transmitter further comprises:

a combiner for combining the set of modulated intermediate frequency signals; and, an RF stage arranged to translate the combined signals to an RF transmission frequency band.

24. A radio transmitter device according to claim 23, wherein the combiner is implemented in the digital domain, and the RF stage is implemented in the analog domain.

25. A radio transmitter device according to claim 23, wherein the combiner and the RF stage are implemented in the analog domain.

26. A radio transmitter device according to claim 21, wherein the transmitter further comprises:

an RF stage positioned after each of the intermediate frequency modulation stages, each RF stage arranged to translate the modulated intermediate frequency signal to an RF transmission frequency band; and, a combiner for combining the set of RF signals.

27. A radio transmitter device according to claim 20, wherein the intermediate frequency modulation stages are arranged to frequency modulate an intermediate frequency signal with the multiplex signal.

28. A radio transmitter device for radio transmission of an audio signal from a portable audio device to a radio receiver, the radio transmitter device comprising:

an audio input for receiving an audio signal from the portable audio device;

a transmitter arranged to simultaneously transmit an RF signal which is modulated with the audio signal on each of a set of at least two different RF channels, each at a different frequency, and the transmitter is further arranged to include, within each of the transmitted RF signals, at least information identifying the RF channels in the set of RF channels, the transmitter further arranged to transmit at or below a predetermined power level.

29. A radio transmitter device according to claim 28, wherein the transmitter is arranged to send the information about the RF channels in the set of RF channels over a Bluetooth link.

30. A radio transmitter device according to claim 28, wherein the transmitter is arranged to send the information about the other RF channels in the Alternate Frequency field of an RDS subcarrier.

31. A portable audio device that includes the radio transmitter according to claim 28.

32. A radio transmitter device according to claim 28, wherein the predetermined power level is a power level set by a regulatory agency in the United States, wherein transmission at a power level above the predetermined power level requires a license from the regulatory agency.

* * * * *